US009490524B2

(12) United States Patent
Miller et al.

(10) Patent No.: US 9,490,524 B2
(45) Date of Patent: Nov. 8, 2016

(54) SPRING BOOT FOR A MOBILE ANTENNA

(75) Inventors: Paul E. Miller, Spring Lake, MI (US); Susan Kay Boelkins, Muskegon, MI (US)

(73) Assignee: R.A. Miller Industries, Inc., Grand Haven, MI (US)

( * ) Notice: Subject to any disclaimer, the term of this patent is extended or adjusted under 35 U.S.C. 154(b) by 42 days.

(21) Appl. No.: 14/114,776

(22) PCT Filed: May 6, 2011

(86) PCT No.: PCT/US2011/035462

§ 371 (c)(1), (2), (4) Date: Dec. 27, 2013

(87) PCT Pub. No.: WO2012/154151

PCT Pub. Date: Nov. 15, 2012

(65) Prior Publication Data

US 2014/0103185 A1 Apr. 17, 2014

(51) Int. Cl.
*F16M 13/00* (2006.01)
*H01Q 1/20* (2006.01)
(Continued)

(52) U.S. Cl.
CPC ................ *H01Q 1/20* (2013.01); *H01Q 1/005* (2013.01); *H01Q 1/085* (2013.01); *H01Q 1/3275* (2013.01)

(58) Field of Classification Search
CPC .......... H01Q 1/002; H01Q 1/04; H01Q 1/12; H01Q 1/18; H01Q 1/20; H01Q 1/24; H01Q 1/34; H01Q 1/085; H01Q 1/005; H01Q 1/3275; H01Q 1/1207; E04H 12/22; E04H 12/2253; B41J 29/08; A47B 91/04
USPC ....... 343/713, 715, 878, 880, 887, 890, 900, 343/872; 248/615, 519, 507
See application file for complete search history.

(56) References Cited

U.S. PATENT DOCUMENTS 2,427,008 A * 9/1947 Lee .......................... H01Q 1/20 174/138 A
2,493,787 A 1/1950 Torretti
(Continued)

FOREIGN PATENT DOCUMENTS

JP 07-094929 A 4/1995
JP 2009-260826 A 11/2009
(Continued)

OTHER PUBLICATIONS

European Search Report dated Sep. 22, 2014; 6 pages; European Patent Office; Munich, Germany.

*Primary Examiner* — Christopher E Garft
(74) *Attorney, Agent, or Firm* — McGarry Bair PC

(57) ABSTRACT

A spring boot for use with an antenna comprises a cylindrical main body having an annular flange at the lower end thereof, and an annular rim at the upper end thereof. The flange has a plurality of mounting holes therethrough. The interior of the spring boot is hollow and is configured to match the shape of the antenna spring. When installed, the spring boot is fitted over the spring, and seated on an antenna mount, encircling the spring. Fasteners are installed through the mounting holes on the flange to affix the spring boot to corresponding bores in the mount. A washer is positioned atop the rim and is fixed between the antenna core and the spring. This configuration effectively constrains the spring boot between the core and the mount, so as to provide added damping to the antenna spring.

8 Claims, 4 Drawing Sheets

(51) Int. Cl.
*H01Q 1/00* (2006.01)
*H01Q 1/32* (2006.01)
*H01Q 1/08* (2006.01)

(56) References Cited

U.S. PATENT DOCUMENTS 4,540,989 A * 9/1985 Day, Jr. .................. H01Q 1/085 343/900
5,229,784 A * 7/1993 Jones ....................... H01Q 9/30 343/878
5,357,261 A * 10/1994 Brandigampola ..... H01Q 1/002 343/715
5,451,967 A 9/1995 Ueda et al.
5,600,334 A * 2/1997 Whitehouse ........... H01Q 1/088 343/715
6,331,838 B1 12/2001 Scott et al.
7,180,460 B1 2/2007 Bogdans et al.

FOREIGN PATENT DOCUMENTS

KR 10-2007-0063933 A 6/2007
WO 2005/101568 A1 10/2005

* cited by examiner

SPRING BOOT FOR A MOBILE ANTENNA

CROSS-REFERENCE TO RELATED APPLICATIONS

This application is a National Phase application of International Application No. PCT/US2011/035462, filed May 6, 2011.

BACKGROUND OF THE INVENTION

1. Field of the Invention

The present invention relates generally to antennas, and more specifically to a boot for spring mount in a mobile antenna.

2. Description of the Related Art

The physical size of an antenna largely depends upon the purpose for which it is to be employed. For example, an antenna for receiving a particular frequency range must have an electrical length capable of resonating within that range to achieve optimum reception. Generally, lower frequencies require longer lengths because the wavelengths at lower frequencies are longer, but limitations in use often demand design modifications to achieve appropriate electrical length in a smaller space. It is known for antennas in some applications on mobile vehicles to be 10 feet or more in length.

Such antennas sometimes have a thin, dielectric, flexible core that carries the electrical radiator and they are mounted to a vehicle by way of a spring. These types of antennas are known as "whip" antennas because the flexible core and spring together absorb energy from forces acting on the antenna, such as impacts. If a whip antenna were to impact an object while the vehicle is in motion, the flexible dielectric core and/or the spring can absorb the force of the impact, preventing damage to the antenna or its mounting.

Some antenna applications, however, are complex, requiring multiple frequency bands, electrical lengths, and other devices that make the use of whip antennas impractical. Such antennas may require diameters of 1 in. or more at a length of 10 feet. The less flexible an antenna is, the more the spring must absorb the energy of an impact against the antenna. It has been observed that an antenna having a molded or extruded fiberglass piece 1¼ in. in diameter and 10 feet long will fail when the antenna is impacted at its midpoint on a vehicle traveling 25 miles per hour. Failures occur either in the spring or in the dielectric piece, or both. These failures can occur both at initial impact and upon the antenna's recoil from the impact where the antenna's mass causes excessive extension of the spring and unnatural forces acting on the spring mounting.

A spring which is too limp will allow over rotation when the antenna hits an obstruction. A spring with larger wire has less elasticity and absorbs less energy when the antenna hits an obstruction, causing the antenna to absorb more of load. Simply changing the spring does not offer a satisfactory solution.

SUMMARY OF THE INVENTION

According to the invention, an antenna assembly includes an antenna mounted to a spring adapted to be secured to a vehicle by way of a mount, a spring boot having an upper rim, a lower portion, and an interior chamber, and a washer. When the spring is secured to the mount, with the spring boot encircling the spring in the interior chamber, and the antenna is secured to the spring through the washer, the spring boot will be constrained between the washer and the mount. This structure will enhance the ability of the antenna to absorb an impact without overstressing the spring and provide additional damping to the spring.

In one aspect, the spring boot comprises a main body and the interior chamber is in the main body and is configured to roughly match the contour of the spring. In another aspect, the spring boot has a plurality of spaced fins extending outwardly from the main body. The plurality of fins can taper from the diameter of the upper rim to the diameter of the lower portion. The plurality of fins can also be four in number.

In another aspect, water tunnels can fluidly communicate the interior chamber with the atmosphere exterior to the spring boot. Further, the spring boot can include a counterbore with a circular undercut slot, and the washer can be received in the circular undercut slot. Yet further, the spring boot can be formed of ethylene propylene diene monomer.

DETAILED DESCRIPTION OF THE DRAWINGS

Figure 1:
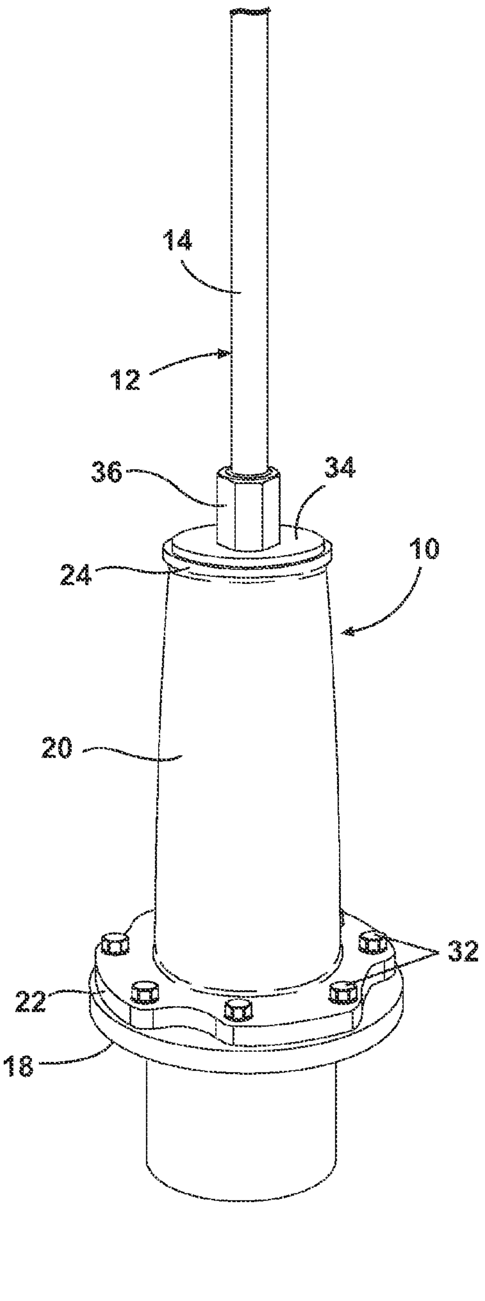
FIG. 1 is a perspective view of a spring boot and an antenna, according to a first embodiment of the invention.
Figure 2:
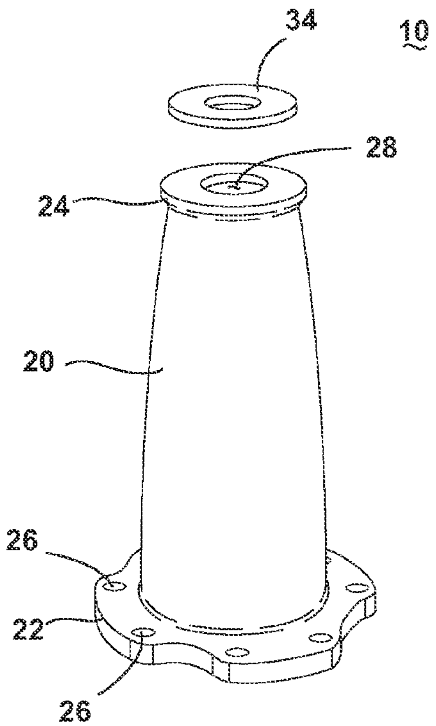
FIG. 2 is a perspective view of the spring boot of FIG. 1.

Referring now to the drawings, FIGS. 1 and 2 illustrate a spring boot 10 according to a first embodiment of the invention, for use with an antenna 12. The antenna 12 comprises a core 14 mounted to a spring 16 (FIG. 4), which, in turn, is mounted to a vehicle (not shown) by a mount 18. The antenna 12 is affixed to the mount 18 via any suitable means. In the illustrated embodiment, the antenna 12 is shown bolted to the mount 18. The core 14 can include a fiberglass dielectric, flexible tube, and the spring 16 is typically a coil spring. The mount 18 is conventional and can be affixed to the vehicle by any suitable means, typically by bolting the antenna 12 to the vehicle. The mount 18 may contain any number of electrical connections and/or components for use with the antenna 12 and vehicle, or other structure that it is affixed to. The structure of the antenna 12 is commonly known in the art, and is not germane to the invention.

Figure 3:
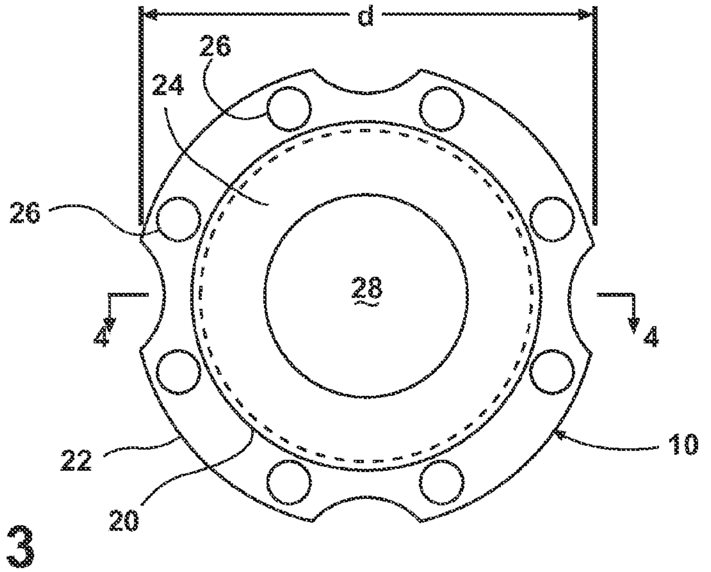
FIG. 3 is a top view of the spring boot of FIG. 1.
Figure 4:
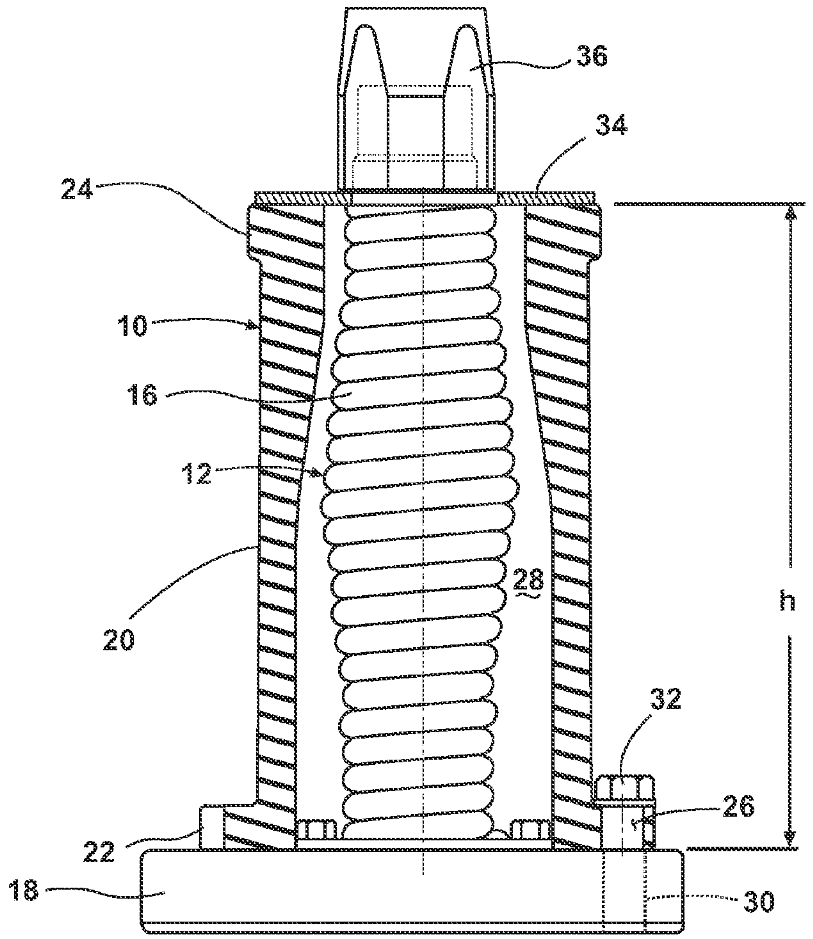
FIG. 4 is a cross-sectional view of the spring boot and antenna of FIG. 1, taken along line 4-4 of FIG. 1.

Referring now also to FIGS. 3 and 4, the spring boot 10 is a generally hollow, roughly cylindrical member having a diameter d and a height h. The spring boot 10 comprises a cylindrical main body 20 having a lower annular flange 22 located at the lower end of the main body 20, and an upper annular rim 24 located at the upper end of the main body 20. The spring boot 10 can be formed of ethylene propylene diene monomer (EPDM) rubber, or any other suitable type of rubber or other elastomer. It is contemplated that the durometer of the elastomer be approximately 75±5; however, this nominal value and range are for exemplary purposes only and are not meant to be so limiting.

The lower flange 22 encircles the main body 20. A plurality of mounting holes 26 extend through the thickness of the flange, and are spaced about the flange, preferably equidistant. In the example illustrated, the spring boot 10 includes eight mounting holes 26; however, more or fewer holes 26 are within the scope of the invention.

In the illustrated embodiment, the diameter of the upper annular rim 24 is slightly greater than the diameter of the main body 20, thereby forming a small rim or lip at the top of the spring boot 10.

The interior of the spring boot 10 is hollow, defining an interior chamber 28, and, in this embodiment, is slightly tapered at an upper portion of the main body 20. In other words, the diameter of the chamber 28 at a lower portion of the main body 20 is larger than the diameter of the chamber 28 at the upper portion of the main body 20. The contour and taper of the interior chamber 28 at the upper portion is thus roughly configured to match the shape of the antenna spring 16.

To install the spring boot 10 onto the antenna 12, the antenna core 14 (FIG. 1) is removed from the spring 16. The spring boot 10 is fitted over the spring 16, and seated on the mount 18, encircling the spring 16 in the interior chamber 28. The spring boot 10 is aligned such that the mounting holes 26 on the flange 22 are in registry with corresponding bores 30 in the mount 18. Fasteners 32 are installed to affix the spring boot 10 to the mount 18.

With the spring boot 10 affixed to the mount 18, the antenna core 14 (FIG. 1) can be reinstalled onto the spring 16. A washer 34 is positioned atop the rim 24, on the upper surface of the spring boot 10. Then, the core 14 is fastened to spring 16 with any suitable attachment means, such as by nut 36, thereby sandwiching the washer 34 between the spring boot 10 and the core 14. Utilizing a washer 34 atop the rim 24 effectively constrains the spring boot 10 between the core 14 and the mount 18.

The spring boot 10 is configured to provide added damping to the antenna spring 16 when the antenna 12 is bent. When mounted to a vehicle (not shown), the antenna 12 is typically placed high and toward the rear of the vehicle; this subjects the antenna 12 to collisions with overhead obstructions, such as tree limbs or other structures. Striking an object, especially at anything above a slow speed, is known to cause failure of antenna elements. The antenna core 14, being substantially rigid, does not bend. Striking the core 14 with great enough force can significantly bend the antenna 12 and can cause a high moment on the spring 16. If the force is great enough, an unrestrained spring 16 may distend beyond its maximum elasticity, resulting in permanent deformation of the spring 16. The spring boot 10 enhances the ability of the antenna 12 to absorb the force of impact without over-stressing the spring 16 and causing it to permanently deform and without damaging the antenna 12. The pliable nature of the rubber material and the constraint of the spring boot 10 between the washer 34 and the mount 18 provide additional damping to the antenna spring 16. The spring boot 10 dampens not only the initial impact, but also dampens the recoil, which can be as damaging, or even more damaging, to the antenna 12, the spring 16, or the vehicle to which the antenna 12 is mounted.

Figure 5:
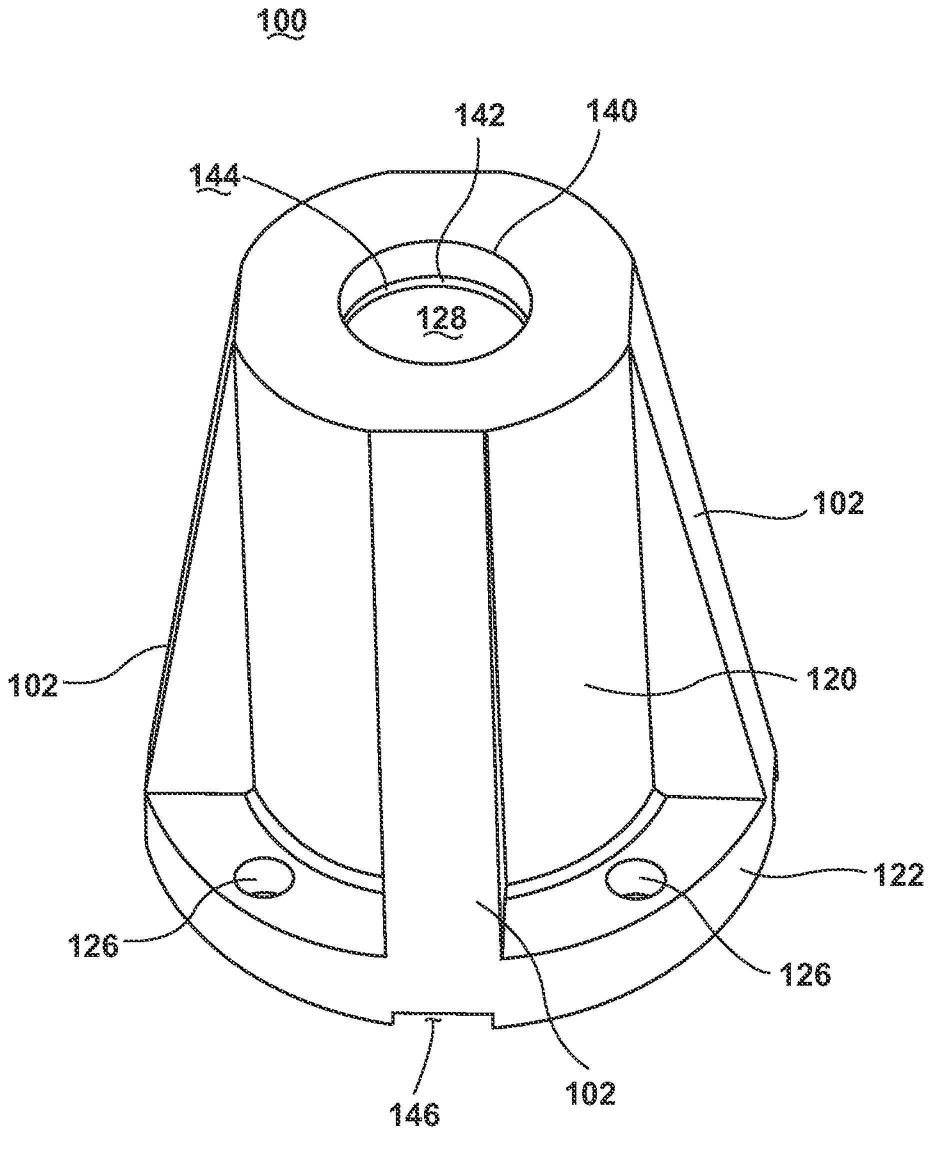
FIG. 5 is a perspective view of a spring boot, according to a second embodiment of the invention.
Figure 6:
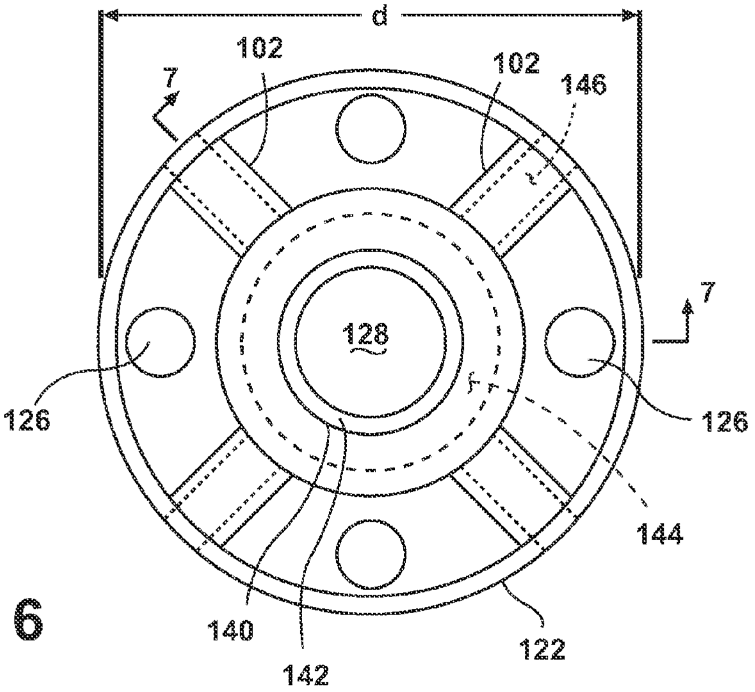
FIG. 6 is a top view of the spring boot of FIG. 5.
Figure 7:
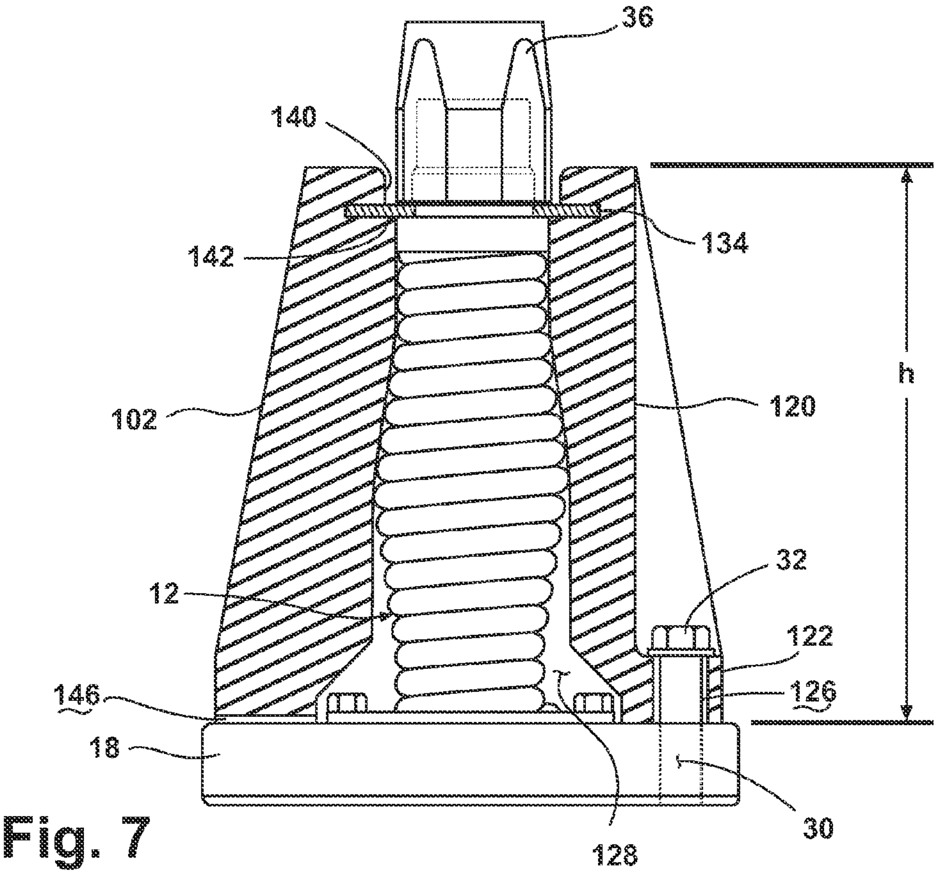
FIG. 7 is a cross-sectional view of the spring boot and an antenna of FIG. 5, taken along line 7-7 of FIG. 5.

FIGS. 5-7 illustrate a second embodiment of the invention where similar elements are identified with like numerals increased by 100. A spring boot 110 comprises similar elements to the spring boot 10 of the first embodiment, but lacks the above described rim 24. The spring boot 110 additionally comprises a plurality of spaced fins 102 that extend outwardly from and along the height h of the main body 120. The fins 102 extend outwardly from the main body 120 and taper from the diameter of the upper portion of the spring boot 110 to the larger diameter of the annular flange 122 at the lower portion of the spring boot 110. In the illustrated example shown in FIG. 5, the spring boot 110 comprises four fins 102; however, more or fewer fins 102 is within the scope of the invention.

Additionally, the upper portion of the spring boot 110 includes a counterbore 140 which forms a shoulder 142. Further, a circular undercut slot 144 is formed at the base of the counterbore 140, at the shoulder 142. In one embodiment, a washer 134 is placed in the mold form tool (not shown) prior to molding the spring boot 110, thereby molding the washer 134 into the rubber material and forming the undercut slot 144. Other suitable methods of manufacture are possible however, including machining the slot 144 and inserting the washer 134 therein.

The spring boot 110 can also comprise at least one water tunnel 146. The illustrated example shows four water tunnels 146, which are positioned under the bases of the fins 102. The water tunnel 146 is a simple indentation formed in the lower face of the spring boot 110, on the underside of the flange 122. The water tunnel 146 extends the thickness of the main body 120 and fin 102, thereby fluidly communicating the chamber 128 to the atmosphere exterior to the spring boot 110. This configuration enables any water that may enter the chamber 128 to pass through the water tunnels 146, preventing water from building up in the chamber 128.

The spring boot 110 is installed in much the same manner as described above for the first embodiment. With the antenna core 14 (FIG. 1) removed from the antenna 12, the spring boot 110 is fitted over the antenna 12, and seated on the mount 18. The spring boot 110 is aligned so that the mounting holes 126 on the flange 122 are in registry with corresponding bores 30 in the mount 18, and fasteners 32 are installed to affix the spring boot 110 to the mount 18.

When installed over the spring 16, the free end of the spring 16 extends through the center of the washer 134, and the core 14 (FIG. 1) is affixed atop the washer 134 to the free end of the spring 16 by any suitable means, such as by nut 36. The embedded washer 134 effectively constrains the spring boot 110 between the core 14 and the mount 18, providing added damping to the spring 16 when the whip antenna 12 is bent, in a similar manner as described above.

It will be apparent that the boot according to the invention allows more give in the spring to provide to an antenna greater survivability of an impact, while preventing over rotation. Also, the inventive design supplies a variable force to the spring. The greater the spring bends from the vertical, the greater the force applied by the boot in order to minimize force acting on the antenna on impact, yet increase resistance to rotation from the vertical in order to inhibit over rotation and increase the life of the spring.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. An antenna assembly comprising:

an antenna (12) having a core (14) mounted to a spring (16), and adapted to be secured to a vehicle by way of a mount (18), a spring boot (10) having an upper rim (24), a lower flange (22), and a hollow interior chamber (28) defined by an interior wall, and fitted over the spring and sitting on the mount with space between the interior wall and an exterior of the spring, and a washer (34), wherein the spring boot is fitted over the spring, the spring (16) is secured to the mount (18), the lower flange (22) is secured to the mount (18) with the spring boot (10) encircling the spring (16) in the interior chamber (28) and independent therefrom, and the core (14) is secured to the spring (16) sandwiching the washer (34) therebetween, the spring boot (10) will be constrained between the washer (34) and the mount (18), whereby to enhance the ability of the antenna (12) to absorb an impact without overstressing the spring (16) and provide additional damping to the spring.

2. The antenna assembly of claim 1 wherein the spring boot (10) comprises a main body (20) and the interior chamber (28) is in the main body (20) and configured to roughly match the contour of the spring (16).

3. The antenna assembly of claim 1 wherein the spring boot (110) comprises a main body (120) and further comprises a plurality of spaced vertical fins (102) extending outwardly from the main body.

4. The antenna assembly of claim 3 wherein the plurality of fins (120) have a diameter that tapers from the diameter of the upper rim (24) to the diameter of the lower flange (22).

5. The antenna assembly of claim 3 where the plurality of fins (24) comprises four fins.

6. The antenna assembly of claim 1 further comprising water tunnels (146) fluidly communicating the interior chamber (28) with the atmosphere exterior to the spring boot (10).

7. The antenna assembly of claim 1 wherein the spring boot (10) comprises a counterbore (140) with a circular undercut slot (144), and the washer (34) is received in the circular undercut slot.

8. The antenna assembly of claim 1 wherein the spring boot (10) is formed of ethylene propylene diene monomer.

* * * * *